(No Model.)

T. LANGSTON.
LANTERN.

No. 528,439. Patented Oct. 30, 1894.

WITNESSES
W. C. Homan
Alfred Dunlop

Thomas Langston
INVENTOR
BY Geo. L. Cooper
ATTORNEY

UNITED STATES PATENT OFFICE.

THOMAS LANGSTON, OF MERIDEN, CONNECTICUT, ASSIGNOR TO THE EDWARD MILLER & COMPANY, OF SAME PLACE.

LANTERN.

SPECIFICATION forming part of Letters Patent No. 528,439, dated October 30, 1894.

Application filed August 11, 1894. Serial No. 520,092. (No model.)

*To all whom it may concern:*

Be it known that I, THOMAS LANGSTON, a citizen of the United States, residing at Meriden, New Haven county, Connecticut, have invented a new and useful Improvement in Lanterns, of which the following is a specification.

My invention relates particularly to the means for supplying the interior of the lantern and the flame with a large volume of air and of securing at the same time steady and perfect combustion.

Figure 1:
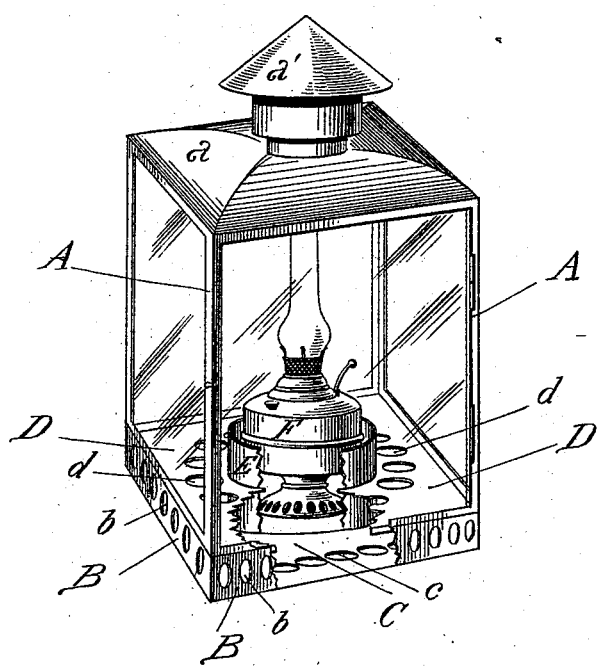
Figure 2:
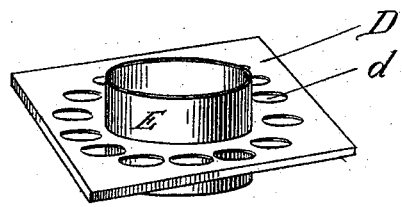

In the accompanying drawings, Figure 1 represents in perspective a lantern embodying my invention. Fig. 2, also in perspective, shows in detail a detached part of my device.

The same letters refer to like parts in both views.

A, designates a lantern body or frame provided with a top $a$, and cowl $a'$; B, a rim at the lower edge of the frame A; $b$, a perforation in the rim B; C, a lantern bottom perforate at $c$; D, a plate or false bottom perforate at $d$; E, a well; F, a lamp.

In the example of my invention illustrated in the drawings, the lantern body or frame A, top $a$, and cowl $a'$, may be of any convenient or desired form. It is provided at its lower edge with a vertical rim B, here shown as extending from the bottom of the lantern to the lower edge of the glass and provided with a large number of perforations $b$. The bottom C of the lantern may also be provided with a row of perforations $c$, preferably near its periphery.

The plate or false bottom D, as shown, corresponds in size and shape to the bottom C, and is supported in any convenient manner substantially at a level with the upper edge of the rim B, within which it fits quite closely. The plate D is provided with a number of perforations $d$, here shown as arranged in a circle around the well E. The well E, here shown as of cylindric form passes through the plate D, preferably rising above the plate and having its lower end resting on the bottom C of the lantern. The lamp F, which is loosely placed within the well E, is here shown as an Argand lamp.

In operation all the air which enters the lantern either to support combustion or to create an upward cooling current must pass through the series of perforations $b$ and $c$ or through either of these series, the other being omitted. The air then passes radially inward under the plate D and upward into the lantern proper through the perforations $d$. The portion of air required to support combustion of the inner mantle of the flame of the Argand lamp F, is drawn over the upper edge of the well E, downward between the well wall and the lamp and upward through the central air supply tube of the lamp. Another portion of air passes through the ordinary perforations in the outer skirt of the lamp burner to maintain combustion at the outer mantle of the flame. Still another and a large portion of the air entering as above described, being warmed by radiation and otherwise, passes upward within the lantern body or globe and outward with the products of combustion through the cowl $a'$. This last volume of air is of great service in preventing the dangerous overheating of the lantern glass.

In practice it is found that when a lantern embodying my invention is exposed to a strong wind, a large portion of the air driven through the perforations $b$, on the windward side of the lantern passes out through the same perforations on the leeward side and that the volume of air passing into the lantern proper is not increased or diminished by a disadvantageous amount, the flame not being considerably disturbed.

It is plain that my device is applicable to a lantern of any desired shape or size. It is particularly advantageous in large fixed lanterns adapted to street, ship or similar uses. It is also clear that various mechanical changes may be made without departing from my invention.

What I claim as my invention, and desire to secure by Letters Patent of the United States, is as follows:

1. In a lantern in combination, a plurality of perforations at or near the lower edge of the lantern, a false bottom or plate extending to the sides of the lantern above said perforations, a plurality of perforations in said plate and a lamp receiving well in said plate, substantially as described.

2. In a lantern in combination, a plurality of perforations at or near the lower edge of the lantern, a false bottom or plate extending to the sides of the lantern above said perforations, a plurality of perforations in said plate, a well in said plate and a lamp of less diameter than said well inclosed therein, substantially as described.

THOMAS LANGSTON.

Witnesses:
GEO. L. COOPER,
CHAS. G. KENDRICK.